(12) United States Patent  
Kukkonen et al.

(10) Patent No.: US 9,133,027 B2  
(45) Date of Patent: Sep. 15, 2015

(54) METHOD AND APPARATUS FOR PRODUCING SYNTHESIS GAS FROM BIOMASS

(75) Inventors: Petri Kukkonen, Helsinki (FI); Pekka Knuuttila, Porvoo (FI); Pekka Jokela, Espoo (FI)

(73) Assignee: UPM-KYMMENE CORPORATION (FI)

( * ) Notice: Subject to any disclaimer, the term of this patent is extended or adjusted under 35 U.S.C. 154(b) by 445 days.

(21) Appl. No.: 12/669,764

(22) PCT Filed: Jul. 18, 2008

(86) PCT No.: PCT/EP2008/059440  
§ 371 (c)(1),  
(2), (4) Date: Jul. 12, 2010

(87) PCT Pub. No.: WO2009/013232  
PCT Pub. Date: Jan. 29, 2009

(65) Prior Publication Data  
US 2010/0280137 A1 Nov. 4, 2010

(30) Foreign Application Priority Data  
Jul. 20, 2007 (FI) .................... 20075557

(51) Int. Cl.  
*C01B 3/24* (2006.01)  
*C01B 3/52* (2006.01)  
(Continued)

(52) U.S. Cl.  
CPC ... *C01B 3/52* (2013.01); *C01B 3/38* (2013.01); *C01B 3/48* (2013.01); *C10G 2/30* (2013.01); *C10G 2/32* (2013.01); *C10J 3/00* (2013.01); *C10J 3/50* (2013.01); *C10J 3/52* (2013.01); *C10J 3/84* (2013.01); *C01B 2203/0233* (2013.01); *C01B 2203/0283* (2013.01); *C01B 2203/0415* (2013.01); *C01B 2203/0475* (2013.01); *C01B 2203/1241* (2013.01);  
(Continued)

(58) Field of Classification Search  
USPC ........................................... 423/650  
See application file for complete search history.

(56) References Cited

U.S. PATENT DOCUMENTS 3,976,443 A 8/1976 Paull et al.  
4,017,271 A 4/1977 Barclay et al.  
(Continued)

FOREIGN PATENT DOCUMENTS

EP 1 136 542 9/2001  
WO WO 2006/127958 11/2006  
(Continued)

*Primary Examiner* — Melvin C Mayes  
*Assistant Examiner* — Kenneth Vaden  
(74) *Attorney, Agent, or Firm* — Cantor Colburn LLP

(57) ABSTRACT

The invention relates to a method and apparatus for producing synthesis gas (7) from biomass (2). The method comprises a step for producing raw product gas (3), and a purifying step comprising several processing steps performed in gas processing means (10, 12, 13, 14) for converting the raw product gas (3) to synthesis gas (7). One processing step is a carbon dioxide removal step for separating carbon dioxide from the stream of raw product gas (3) in a gas processing means comprising a gas purificator (10). The method comprises a step for feeding a stream of the carbon dioxide (9) from the gas purificator (10) to at least one part of the apparatus, said at least one part of the apparatus being selected from: the biomass supply system (4), the gasifier (6) and at least one of the gas processing means (10, 12, 13, 14).

15 Claims, 1 Drawing Sheet

(51) Int. Cl.
*C01B 3/38* (2006.01)
*C01B 3/48* (2006.01)
*C10G 2/00* (2006.01)
*C10J 3/00* (2006.01)
*C10J 3/50* (2006.01)
*C10J 3/52* (2006.01)
*C10J 3/84* (2006.01)

(52) U.S. Cl.
CPC ..... *C10G2300/1011* (2013.01); *C10J 2200/15* (2013.01); *C10J 2300/0916* (2013.01); *C10J 2300/0969* (2013.01); *C10J 2300/1659* (2013.01); *C10J 2300/1693* (2013.01); *C10J 2300/1807* (2013.01); *Y02E 20/18* (2013.01); *Y02E 50/32* (2013.01); *Y02W 10/40* (2015.05)

(56) References Cited

U.S. PATENT DOCUMENTS

| | | | |
|---|---|---|---|
| 4,177,120 A | 12/1979 | Zenty | |
| 5,154,732 A * | 10/1992 | Hakulin et al. | 48/62 R |
| 6,991,769 B2 * | 1/2006 | Kaneko et al. | 422/187 |
| 7,429,373 B2 * | 9/2008 | Pez et al. | 423/652 |
| 2003/0167692 A1 | 9/2003 | Jewell et al. | |
| 2006/0058564 A1 * | 3/2006 | Sills et al. | 585/709 |
| 2007/0068077 A2 * | 3/2007 | Suyama et al. | 48/197 R |
| 2007/0270511 A1 * | 11/2007 | Melnichuk et al. | 518/700 |

FOREIGN PATENT DOCUMENTS

| | | |
|---|---|---|
| WO | WO 2007/042562 | 4/2007 |
| WO | WO 2007042562 A1 * | 4/2007 |

* cited by examiner

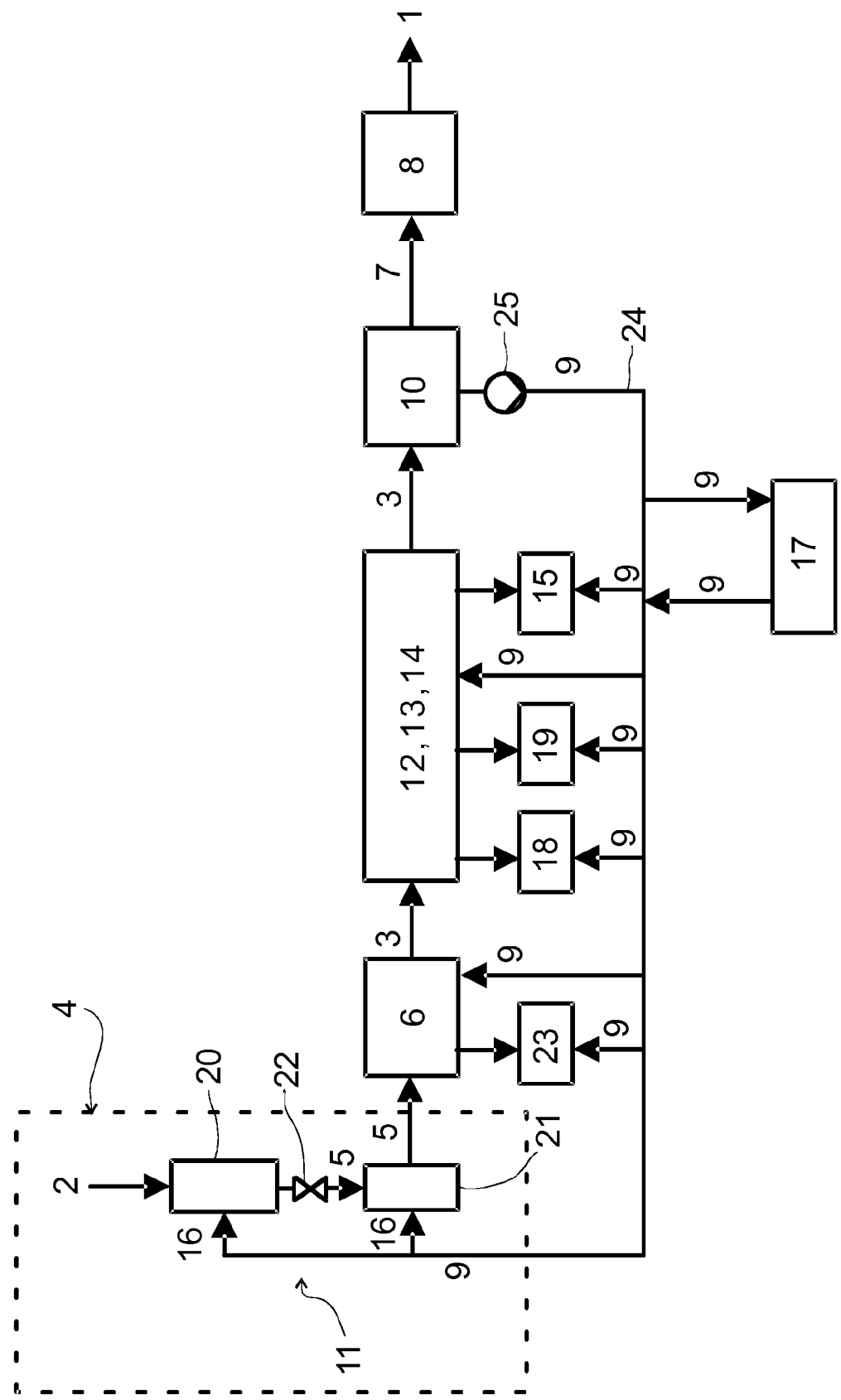

METHOD AND APPARATUS FOR PRODUCING SYNTHESIS GAS FROM BIOMASS

CLAIM OF PRIORITY

This application claims priority under 35 USC 371 to International Application No. PCT/EP2008/059440, filed on Jul. 18, 2008, which claims priority to Finland Application Serial No. 20075557, filed Jul. 20, 2007, each of which is incorporated by reference in its entirety.

FIELD OF THE INVENTION

The invention relates to a method for producing synthesis gas from biomass.

The invention also relates to an arrangement for producing synthesis gas from biomass.

The invention relates to improvements relating to the production of a mixture of hydrogen and carbon monoxide (hereinafter "synthesis gas") that can for example be used for the production of liquid hydrocarbon products biomass in a Fischer-Tropsch process. In a Fischer-Tropsch process a synthesis gas is converted into a hydrocarbon product in a reactor using a suitable catalyst at a high temperature and pressure.

Publication WO 2007/042562 (SHELL INTERNATIONALE RESEARCH MAATSCHAPPIJ B.V.) discloses separation of carbon dioxide and using of the separated carbon dioxide in a process for producing synthesis gas from a carbonaceous fuel. The process comprises a step for supplying a carbonaceous fuel and an oxygen-containing stream to a burner of a gasification reactor, wherein a carbon dioxide containing stream is used to transport the solid carbonaceous fuel to the burner. The process comprises a step for partially oxidizing the carbonaceous fuel in the gasification reactor, thereby obtaining a gaseous stream at least containing carbon monoxide, carbon dioxide, and hydrogen. The process comprises a step for removing the gaseous stream from the gasification reactor. This publication suggests that the process can comprise a step for shift converting the gaseous stream by at least partially converting carbon monoxide into carbon dioxide, thereby obtaining a carbon monoxide depleted stream. The carbon monoxide depleted stream can be subjected to a carbon dioxide recovery system, thereby obtaining a carbon dioxide rich stream and a carbon dioxide poor stream. This publication suggests that the carbon dioxide rich stream is at least partially used as the carbon dioxide containing stream for transporting the solid carbonaceous fuel to the burner.

Publication WO 2007/042564 (SHELL INTERNATIONALE RESEARCH MAATSCHAPPIJ B.V.) discloses separation of carbon dioxide and using of the separated carbon dioxide in a process for preparing a hydrocarbon product from a solid carbonaceous fuel. The process comprises a step for supplying a solid carbonaceous fuel to a burner of a gasification reactor, wherein a carbon dioxide containing stream is used to transport the solid carbonaceous fuel to the burner. The process comprises a step for partially oxidizing the carbonaceous fuel in the gasification reactor, thereby obtaining a gaseous stream at least containing carbon monoxide, carbon dioxide, and hydrogen. The process comprises a step for removing the gaseous stream from the gasification reactor. The process comprises an optional step for shift converting at least part of the gaseous stream removed from the gasification reactor, thereby obtaining a carbon monoxide depleted stream. The process comprises a step for subjecting the gaseous stream and/or the optional carbon monoxide depleted stream to a Fischer-Tropsch reactor to obtain a hydrocarbon product. This publication suggests that the process can comprise a step for subjecting the carbon monoxide depleted stream to a carbon dioxide recovery system, thereby obtaining a carbon dioxide rich stream and a carbon dioxide poor stream which is used in the step for subjecting the gaseous stream and/or the optional carbon monoxide depleted stream to a Fischer-Tropsch reactor to obtain a hydrocarbon product. This publication suggests that the carbon dioxide recovery system is a combined carbon dioxide/hydrogen sulfide removal system in which the removal system methanol is used as the physical solvent. This publication suggests that the carbon dioxide rich stream obtained from the carbon dioxide recovery system is at least partially used as the carbon dioxide containing transport gas to transport the solid carbonaceous fuel to the burner.

OBJECTIVE OF THE INVENTION

The object of the invention is to provide a new and inventive method and apparatus for producing a synthesis gas from biomass.

SHORT DESCRIPTION OF THE INVENTION

The method for producing synthesis gas from biomass of the invention is characterized by the the specification herein.

Preferred embodiments of the method are defined in the specification herein.

The apparatus for producing synthesis gas from biomass of the invention is correspondingly characterized by the specification herein.

Preferred embodiments of the apparatus are defined in the specification herein.

In the method according to the invention for producing synthesis gas from biomass an apparatus is used, which comprises a gasifier for gasifying biomass to produce raw product gas and which comprises gas processing means for purifying raw product gas to produce synthesis gas. The method comprises a production step for producing raw product by feeding a stream of pressurized biomass into the gasifier for at least partial combustion of the biomass to obtain a stream of raw product gas, wherein the stream of pressurized biomass is fed to the gasifier by means of pressurizing gas in a biomass supply system. The method comprises a purifying step for feeding the stream of raw product gas from the gasifier through said several of gas processing means, wherein each of said several gas processing means is arranged for performing a processing step of said purifying step for converting the stream of raw product gas to a stream of synthesis gas. One of the processing steps is a carbon dioxide removal step for separating carbon dioxide from the stream of raw product gas in a gas processing means comprising a gas purificator. The method comprises a feeding step for feeding a stream of the carbon dioxide separated in the gas purificator to at least one part of the apparatus, said at least one part of the apparatus being selected from: the biomass supply system, the gasifier, and at least one of the gas processing means.

The apparatus according to the invention for producing synthesis gas from biomass comprises a biomass supply system for producing a stream of pressurized biomass by pressurizing biomass with pressurizing gas. The apparatus comprises also a gasifier for at least partial combustion of the pressurized biomass fed to the gasifier to obtain a stream of raw product gas. The apparatus comprises several gas processing means, wherein each of said several gas processing means is configured for performing a processing step of a purifying step for converting the stream of raw product gas into a stream of synthesis gas. One of the several gas processing means comprises a gas purificator for separating carbon dioxide from the stream of raw product gas. The apparatus comprises feeding means for feeding a stream of the carbon dioxide separated in the gas purificator from the stream of raw product gas to at least one part of the apparatus, said at least one part of the apparatus being selected from: the biomass supply system, the gasifier and at least one of the several processing means.

As raw material for the process, almost any kind of biomass is suitable for being gasified. If needed, the biomass is first dried to bring its moisture content down to 35 w-% or less such as 10-20 w-%. The biomass is typically selected from virgin and waste materials of plants, animal and/or fish origin, such as municipal waste, industrial waste or by-products, agricultural waste or by-products (including also dung), waste or by-products of the wood-processing industry, waste or by-products of the food industry, marine plants (such as algae) and combinations thereof. The biomass material is preferably selected from non-edible resources such as non-edible wastes and non-edible plant materials, including oils, fats and waxes. A preferred biomass material according to the present invention comprises waste and by products of the wood-processing industry such as residue, urban wood waste, lumber waste, wood chips, sawdust, straw, firewood, wood materials, paper, by-products of the papermaking or timber processes, short rotation crops etc. The biomass material for the process may also comprise vegetable oils, animal fats, fish oils, natural waxes, and fatty acids.

The raw product gas formed in the gasifier comprises as carbon monoxide and hydrogen, as main components. In addition, it contains carbon dioxide and methane and other gaseous substances.

In the invention gaseous carbon dioxide is separated in a carbon dioxide removal step of the purifying step from the stream of raw product gas and the carbon dioxide separated is used in at least one part of the apparatus.

Said at least one part of the apparatus is: 1) the biomass supply system, 2) the gasifier, and 3) at least one of several purifying means.

The synthesis gas can be fed to an additional process step for converting it into a liquid hydrocarbon product, for example to a Fischer-Tropsch reactor.

It is known in the art of gasification to use nitrogen ($N_2$) as transporting gas in feeding of the fuel to the gasifier. It is also known that it is preferred to use carbon dioxide instead of nitrogen as a feeding gas in a method or apparatus comprising a Fischer-Tropsch process, because nitrogen reduces the capacity of the Fischer-Tropsch reactor and the capacity of possible catalysts used in it. Nitrogen also reduces the capacity of other possible catalysts used in the purifying steps for converting the raw product gas to a synthesis gas. Nitrogen has also been used as inertization gas for process steps, reactors and other equipment used in a process producing synthesis gas by gasification of hydrocarbon fuel.

Carbon dioxide does not negatively affect the performance of the apparatus in the same way as nitrogen. An advantage of the invention is that the carbon dioxide that is to be used in the apparatus can be produced from the raw product gas. The volymetric flow of the produced carbon dioxide can be about 25 vol-% of the total gas stream. By separating the carbon dioxide from the raw product gas, recycling it back to the process, and recovering it again before the synthesis gas is led forward, it is possible to use all of the carbon dioxide in the cycle. In addition, the pressure of the recovered carbon dioxide is in a suitable level for recycling.

The invention includes a carbon dioxide removal step for separating carbon dioxide from the stream of raw product gas as a separate stream. Said carbon dioxide removal step for separating of carbon dioxide from the stream of raw product gas in a gas processing means comprising a gas purificator includes preferably, but not necessarily, the steps of subjecting the stream of raw product gas to methanol at a low temperature and at a high pressure to obtain a solvent containing at least carbon dioxide, lowering the pressure of the solvent containing at least carbon dioxide and/or steam stripping the solvent to release and recover the carbon dioxide. Said carbon dioxide removal step for separating of carbon dioxide from the stream of raw product gas in a gas processing means comprising a gas purificator includes alternatively, but not necessarily, the steps of subjecting the stream of raw product gas to physical solvent at a high pressure to dissolve (absorb) carbon dioxide, in the physical solvent and lowering the pressure of the solvent containing at least carbon dioxide and/or steam stripping the solvent containing at least carbon dioxide to release and recover the carbon dioxide. Alternatively an amine treating process is used in the carbon dioxide removal step.

In one embodiment of the invention a lock-hopper is used in the biomass supply system in the production step for feeding the biomass to the gasifier. The lock-hopper is used to obtain a stream of pressurized biomass. In this embodiment of the invention a stream of the carbon dioxide separated from the stream of raw product gas is fed into the lock-hopper. The carbon dioxide is used as pressuring gas in the lock hopper to raise the pressure of the biomass to about the same pressure level that is prevailing in the gasifier prior feeding biomass from the biomass supply system into the gasifier. The pressure level in the gasifier can for example be between 2 and 25 bar, preferably between 8 and 12, for example about 10 bar.

In another embodiment of the invention a gasifier is used in the production step to obtain the stream of raw product gas by at least partly combusting biomass in stoichiometric conditions. In this embodiment of the invention a stream of the carbon dioxide separated from the stream of raw product gas is fed into the gasifier for extracting bottom ash in the gasifier.

In a still another embodiment of the invention one of the several processing steps in the purifying step for converting the stream of raw product gas into a stream of synthesis gas is a catalytic processing step performed in a reformer. In this embodiment a stream of the carbon dioxide separated from the stream of raw product gas is fed into the reformer for removing sediments such as ash and/or soot sediments from the surface(s) of the catalysts in the reformer. The carbon dioxide is preferably fed as a pulsing stream of carbon dioxide into the reformer for removing sediments such as ash and/or soot sediments from the surface(s) of the catalysts in the reformer. By feeding the carbon dioxide as gas pulses to the reformer the sediments/particles are effectively released from the surfaces of the reformer thus improving the working of the reformer In still another embodiment of the invention, the purifying step of the method comprises a cooling step for lowering the temperature of the stream of the raw product gas, which cooling step is performed in a cooler. In this embodiment of the invention a stream of the carbon dioxide separated from the stream of raw product gas is fed into the cooler for removing sediments such as ash and/or soot sediments from the cooler. Also in this embodiment, the carbon dioxide is preferably fed as a pulsing stream into the cooler. Removing of the sediments/particles from the surfaces of the cooler improves the working of the cooler.

In still another embodiment of the invention one of the several processing steps in the purifying step for converting the stream of raw product gas to a stream of synthesis gas is a filtering step for filtering the stream of the raw product gas, which filtering step is performed by a filter. In this embodiment of the invention a stream of the carbon dioxide separated from the stream of raw product gas is fed into the filter for removing sediments such as ash and/or soot sediments from filter. In this embodiment of the invention a stream of the carbon dioxide separated from the stream of raw product gas is preferably fed as a pulsing stream of carbon dioxide into the filter for removing sediments such as ash and/or soot sediments from filter. Especially by feeding the carbon dioxide as gas pulses into the filter the sediments/particles are effectively released from the surfaces of the filter thus improving the working of the filter. This embodiment of the invention includes preferably, but not necessarily, a particle feeding step for feeding particles removed from the stream of the raw product gas in the filter to a fly ash discharge vessel. In this embodiment of the invention the carbon dioxide is preferably, but not necessarily, fed to the bottom of the fly ash discharge vessel for separating an ash fraction from an unburned soot/char fraction. The carbon dioxide acts as a pressurizing gas in the fly ash discharge vessel, and is preferably fed into the fly ash discharge vessel prior feeding particles from the filter into the fly ash discharge vessel. The pressure in the fly ash discharge vessel is raised to about the same level than in the filter. The pressure level in the filter can for example be between 2 and 25 bar, preferably between 8 and 12 bar, for example about 10 bar.

A preferred embodiment of the invention includes feeding a stream of the carbon dioxide separated in the gas purificator from the stream of raw product gas from the gas purificator into the apparatus for removing other gases from the apparatus for inertization of the apparatus. If nitrogen would be used for this purpose, it would for example decrease the efficiency of an optional Fischer-Tropsch process that can be used for converting the synthesis gas into liquid carbonaceous product.

A preferred embodiment of the invention includes feeding a stream of the carbon dioxide separated in the gas purificator from the stream of raw product gas from the gas purificator into the apparatus in case of a shutdown of the process as a protective gas, for preventing oxidization of the apparatus, in particular oxidization of any of the purifying means, during the shutdown. The same procedure can be used in case of process disturbances, for preventing oxidization of the apparatus, in particular oxidization of any of the purifying means.

A preferred embodiment of the invention includes a step for feeding a stream of the carbon dioxide separated in the gas purificator to a storage means. This preferred embodiment of the invention includes preferably, but not necessarily, a step for feeding a stream of carbon dioxide from the storage means into the apparatus for removing gases from the apparatus or for using carbon dioxide as a protective gas during shutdown or startup of the apparatus. This preferred embodiment of the invention includes preferably, but not necessarily, a step for feeding a stream of the carbon dioxide from the storage means into at least one part of the apparatus, said at least one part of the apparatus being selected from: the biomass supply system, the gasifier, and at least one of said several gas processing means.

DETAILED DESCRIPTION OF THE INVENTION

The FIGURE shows an example of a method and an apparatus for producing a liquid hydrocarbon product 1 from a biomass 2.

The liquid hydrocarbon product 1 is for example so-called biodiesel and the biomass 2 is for example bark, stumps, or corresponding forest residue.

First a method for producing a liquid hydrocarbon product 1 from a biomass 2 and preferred embodiments of the method will be described.

In the method an apparatus is used, which comprises a biomass supply system 4, a gasifier 6 for gasifying biomass 2 to produce raw product gas 3 and several gas processing means for purifying raw product gas 3 to produce synthesis gas 7.

The method comprises a production step for producing a stream of raw product gas 3 by pressurizing biomass 2 with pressurizing gas 16 in a biomass supply system 4 to firstly obtain a stream of pressurized biomass 5 and by secondly feeding the stream of pressurized biomass 5 into the gasifier 6 by means of for example a screw conveyer (not shown in the FIGURE) for at least partial combustion of the pressurized biomass 5 in stoichiometric conditions to obtain the stream of raw product gas 3.

The biomass 2 is preferably in the form of crushed biomass particles having a diameter between 30 and 80 mm preferably below 50 mm.

The method comprises a purifying step for feeding the stream of raw product gas 3 from the gasifier 6 through said several gas purifying means. In the FIGURE said several gas purification means comprises a gas purificator 10, a reformer 12, a cooler 13, and a filter 14, each of which arranged for performing a processing step in the purifying step for converting the stream of raw product gas 3 to a stream of synthesis gas 7.

The method can in addition comprise a converting step for feeding the stream of synthesis gas 7 into a Fisher-Tropsch reactor 8 to convert the synthesis gas into a liquid hydrocarbon product 1.

Alternatively to the converting step for feeding the stream of synthesis gas 7 into a Fisher-Tropsch reactor 8 to convert the synthesis gas into a liquid hydrocarbon product 1, the method can in addition comprise a step for subjecting the synthesis gas to a methanol synthesis or to a ethanol synthesis or a step for hydro formylation of the synthesis gas to produce aldehydes.

One of the several processing steps is a carbon dioxide removal step for separating carbon dioxide from the stream of raw product gas 3, which carbon dioxide removal step is performed in a processing means comprising a gas purificator 10.

The gas purificator 10 is preferably, but not necessarily, configured to perform a process in which methanol is used as a solvent for separating carbon dioxide from the stream of raw product gas 3. Said carbon dioxide removal step includes preferably, but not necessarily, the steps of subjecting the stream of raw product gas 3 to methanol at a low temperature and at a high pressure to obtain a solvent containing at least carbon dioxide, and lowering the pressure of the solvent containing at least carbon dioxide and/or steam stripping the solvent containing at least carbon dioxide to release and recover the carbon dioxide. Said carbon dioxide removal step includes alternatively, but not necessarily, the steps of subjecting the stream of raw product gas to physical solvent at a high pressure to dissolve (absorb) carbon dioxide, in the physical solvent and lowering the pressure of the solvent containing at least carbon dioxide and/or steam stripping the solvent containing at least carbon dioxide to release and recover the carbon dioxide. Alternatively an amine treating process is used in the $CO_2$ removal step for separating carbon dioxide from the stream of raw product gas.

The method comprises a feeding step for feeding a stream of the carbon dioxide 9 separated in the gas purificator 10 to at least one part of the apparatus, said at least one part of the apparatus being selected from: the biomass supply system 4, the gasifier 6 and at least one processing means (10 (the gas purificator), 12 (a reformer), 13 (a cooler), and 14 (a filter). That a stream of the carbon dioxide 9 separated in the gas purificator 10 to at least one part of the apparatus means that either all of the carbon dioxide 9 separated in the gas purificator 10 can be fed to at least one part of the apparatus or that a part of the carbon dioxide 9 separated in the gas purificator 10 can be fed to at least one part of the apparatus.

The apparatus comprises feeding means 24 for feeding a stream of the carbon dioxide 9 separated in the gas purificator 10 to at least one part of the apparatus, said at least one part of the apparatus being selected from: the biomass supply system 4, the gasifier 6 and at least one processing means (10 (the gas purificator), 12 (a reformer), 13 (a cooler), and 14 (a filter).

In the method shown in the FIGURE a lock-hopper 11 is used in the biomass supply system 4 in the production step for feeding the biomass to the gasifier. A stream of the carbon dioxide separated in the gas purificator 10 is fed from the gas purificator 10 into the lock-hopper 11. The carbon dioxide is used as pressurizing gas 16 in the lock-hopper 11. The lock-hopper comprises a first fuel feeding silo 20 and a second fuel feeding silo 21. The first and second silos are connected by a duct equipped with a valve 22. The function and the different parts belonging to a lock-hopper are well known to a man skilled in the art. Because of this, the function of a lock-hopper is in the following described in a most simplified way and the description is in no way intended to limit the arrangement. Biomass 2 is fed to the first fuel silo 20 at ambient pressure. Thereafter carbon dioxide is fed into the first fuel silo 20 to raise the pressure inside it to about the pressure level as is prevailing in the gasifier 6. The pressure level in the gasifier can for example be between 8 and 12 bar, for example about 10 bar. The valve 22 is thereafter opened and the pressurized biomass 5 is fed from the first fuel feeding silo 20 to the second fuel feeding silo 21. Next, the valve 22 is closed, the pressure inside the first fuel silo 20 is lowered to ambient pressure and loading sequence starts again. From the second fuel feeding silo 21 the pressurized biomass 5 is fed into the gasifier 6 for example by means of a screw conveyer (not shown in the FIGURE).

In the method shown in the FIGURE a gasifier 6 is used in the production step to obtain the stream of raw product gas 3. A stream of the carbon dioxide 9 separated in the gas purificator 10 is in the FIGURE fed from the gas purificator 10 into an ash discharge vessel 23 of the gasifier 6 for extracting bottom ash of the ash discharge vessel of the gasifier 6.

If the gasifier 6 used in the method comprises such ash discharge vessel 23 of the gasifier 6, the method includes preferably, but not necessarily, feeding a stream of the carbon dioxide 9 into the ash discharge vessel 23 of the gasifier 6 for raising the pressure level inside the ash discharge vessel 23 of the gasifier 6 to about the same pressure level as is prevailing in of the gasifier 6 at least for the time when ash is fed from the gasifier 6 into the ash discharge vessel 23 of the gasifier 6. The pressure level in the gasifier 6 can for example be between 2 and 25 bar, preferably between 8 and 12 bar, for example about 10 bar. A valve (not shown in the figures) is arranged between the gasifier 6 and the ash discharge vessel 23 of the gasifier 6. When the ash discharge vessel 23 of the gasifier is to be emptied the valve is closed and the pressure inside the ash discharge vessel 23 of the gasifier 6 can thereafter be lowered to the atmospheric pressure after which the ash discharge vessel 23 of the gasifier 6 can be emptied.

The stream of carbon dioxide 9 can also be fed into the gasifier 6 for regulating the temperature inside the gasifier 6. The carbon dioxide 9 reacts, due to the high temperature prevailing in the gasifier 6, endothermically i.e. as a heat absorbing reaction which converts carbon dioxide 9 into carbon monoxide. This endothermic reaction lowers the temperature inside the gasifier 6.

One of the several processing steps in the process for converting the stream of raw product gas 3 to a stream of synthesis gas 7 is preferably, but not necessarily, a catalytic processing step that is, a reforming step, performed in a reformer 12. The reformer 12 converts the hydrocarbons contained in the raw synthesis gas into carbon monoxide and hydrogen. The reforming of hydrocarbons is usually carried out using solid catalytic materials, at temperatures 700-1000° C. If the purifying step of the method comprises such reforming step, a stream of the carbon dioxide 9 separated in the gas purificator 10 can be used as a cleaning agent in the reformer 12. The carbon dioxide is fed from the gas purificator 10 into the reformer 12 for removing sediments such as ash and/or soot sediments from the surface(s) of the reformer 12 and from the catalysts in the reformer 12. The carbon dioxide 9 is preferably, but not necessarily, fed as a pulsing stream of carbon dioxide into the reformer 12 for removing sediments from the surface(s) of the reformer 12 and from of the catalysts in the reformer 12.

If the purifying step of the method comprises such reforming step, the purifying step includes preferably, but not necessarily, a feeding step for feeding ash and/or soot (not shown in the FIGURE) removed from the surface(s) of the of the reformer 12 and from catalysts in the reformer 12 to an ash and/or soot discharge vessel 18 of the reformer. If the purifying step of the method comprises such feeding step, a stream of the carbon dioxide 9 is preferably, but not necessarily, fed into the soot discharge vessel 18 of the reformer for raising the pressure level inside the soot discharge vessel 18 of the reformer to about the same pressure level that is prevailing in the reformer 12 at least for the time when ash and/or soot is fed from the reformer 12 into the soot discharge vessel 18 of the reformer. The pressure level in the reformer 12 can for example be between 2 and 25 bar, preferably between 8 and 12 bar, for example about 10 bar. A valve (not shown in the figures) is preferably arranged between the reformer 12 and the soot discharge vessel 18 of the reformer. When the soot discharge vessel 18 of the reformer is to be emptied the valve is closed and the pressure inside the soot discharge vessel 18 of the reformer is lowered to the atmospheric pressure after which the soot discharge vessel 18 of the reformer can be emptied.

The purifying step of the method comprises preferably, but not necessarily, a cooling step for lowering the temperature of the stream of the raw product gas 3, which cooling step is performed in a cooler 13. If the purifying step of the method comprises such cooling step, a stream of the carbon dioxide 9 separated in the gas purificator 10 from the stream of raw product gas 3 can be used as a cleaning agent in the cooler. The carbon dioxide is fed from the gas purificator 10 into the cooler 13 for removing sediments such as ash and/or soot sediments from the cooler 13. The carbon dioxide 9 is more preferably, but not necessarily, fed as a pulsing stream of carbon dioxide into the cooler 13 for removing sediments such as ash and/or soot sediments from the cooler 13.

If the purifying step of the method comprises such cooling step, the purifying step includes preferably, but not necessarily, a feeding step for feeding ash and/or soot (not shown in the FIGURE) removed from the cooler 13 to an ash and/or soot discharge vessel 19 of the cooler. If the purifying step of the method comprises such feeding step, a stream of the carbon dioxide 9 is preferably, but not necessarily, fed into the soot discharge vessel 19 of the cooler for raising the pressure level inside the soot discharge vessel 19 of the cooler to about the same pressure level as is prevailing in the cooler 13 at least for the time when ash and/or soot is fed from the cooler 13 into the soot discharge vessel 18 of the cooler. The pressure level in the cooler 13 can for example be between 2 and 25 bar, preferably between 8 and 12 bar, for example about 10 bar. A valve (not shown in the figures) is preferably arranged between the cooler 13 and the soot discharge vessel 19 of the cooler. When the soot discharge vessel 19 of the cooler is to be emptied the valve is closed and the pressure inside the soot discharge vessel 19 of the cooler is lowered to the atmospheric pressure after which the soot discharge vessel 19 of the cooler can be emptied.

One of the several processing steps in the process for converting the stream of raw product gas 3 to a stream of synthesis gas 7 is preferably, but not necessarily, a filtering step for cleaning the stream of the raw product gas 3, which filtering step is performed in a filter 14. The filter 14 removes solid particles such as fly ash, soot, char, bed material, and dolomite that are in the raw product gas 3. If the purifying step of the method comprises such filtering step, a stream of the carbon dioxide 9 separated in the gas purificator 10 from the stream of raw product gas 3 can be used as a cleaning agent in the cooler. The carbon dioxide is fed from the gas purificator 10 into the filter 14 for removing sediments such as ash and/or soot sediments from the filter 14. The carbon dioxide 9 is preferably, but not necessarily, fed as a pulsing stream of carbon dioxide 9 into the filter 14 for removing sediments such as ash and/or soot sediments from the filter 14.

If the purifying step of the method comprises such filtering step, the purifying step includes preferably, but not necessarily, a particle feeding step for feeding solid particles (not shown in the FIGURE) removed from the stream of the raw product gas 3 in the filter 14 to a fly ash discharge vessel 15, which is functionally connected to the filter 14 and configured to receive solid particles removed from the raw product gas 3 flowing through the filter 14.

If the purifying step of the method comprises such particle feeding step, a stream of the carbon dioxide 9 separated in the gas purificator 10 from the stream of raw product gas 3 is preferably, but not necessarily, fed onto the bottom of the fly ash discharge vessel 15 for separating an ash fraction (not shown in the FIGURE) from an unburned soot/char fraction (not shown in the FIGURE) in the fly ash discharge vessel 15.

If the purifying step of the method comprises such particle feeding step, the carbon dioxide 9 is preferably, but not necessarily, fed into the fly ash discharge vessel 15 for raising the pressure level inside the fly ash discharge vessel 15 to about the same pressure level as is prevailing in the filter 14 at least for the time when particles is fed from the filter 14 into the fly ash discharge vessel 15. The pressure level in the filter 14 can for example be between 2 and 25 bar, preferably between 8 and 12 bar, for example about 10 bar. A valve (not shown in the figures) is preferably arranged between the filter 14 and the fly ash discharge vessel 15. When the fly ash discharge vessel 15 is to be emptied the valve is closed and the pressure inside the fly ash discharge vessel 15 is lowered to the atmospheric pressure after which the fly ash discharge vessel 15 can be emptied.

The method includes preferably, but not necessarily, feeding the stream of the carbon dioxide 9 separated in the gas purificator 10 from the stream of raw product gas 3 into the apparatus for inertization of the apparatus. For example, startup of the process, carbon dioxide 9 can be fed into the apparatus for removing possible oxygen residues present in the apparatus for inertization of the process. Also, case of a shutdown of the process carbon dioxide 9 can be fed into the apparatus for removing raw product gas 3 or synthesis gas 7 from the process for inertization of the process.

The method includes preferably, but not necessarily, feeding the stream of carbon dioxide 9 separated in the gas purificator 10 from the stream of raw product gas 3 into the apparatus in case of a shutdown of the process for preventing oxidization of the apparatus, in particular oxidization of any of the purifying means, during the shutdown.

The method includes preferably, but not necessarily, a step for feeding a stream of the carbon dioxide 9 separated in the gas purificator 10 to a storage means 17.

If the method includes a step for feeding a stream of the carbon dioxide 9 separated in the gas purificator 10 to a storage means 17, the method includes preferably, but not necessarily, a step for feeding a stream of carbon dioxide 9 from the storage means 17 into the apparatus for removing gases from the apparatus or for using carbon dioxide 9 as a protective gas during shutdown or startup of the apparatus.

If the method includes a step for feeding a stream of the carbon dioxide 9 separated in the gas purificator 10 to a storage means 17, the method includes preferably, but not necessarily a step for feeding a stream of the carbon dioxide 9 from the storage means 17 into at least one part of the apparatus, said at least one part of the apparatus being selected from: the biomass supply system 4, the gasifier 6, and at least one of said several gas processing means 10, 12, 13, 14.

Next an apparatus for producing a liquid hydrocarbon product 1 from a biomass 2 and preferred embodiments of the apparatus will be described.

The apparatus comprises a biomass supply system 4 for feeding biomass to a gasifier by means of producing a stream of pressurized biomass 5 by pressurizing biomass 2 with pressurizing gas.

The apparatus comprises a gasifier 6 for at least partial combustion of the pressurized biomass 5 in stoichiometric conditions to obtain a stream of a raw product gas 3.

The apparatus shown in the FIGURE comprises a Fisher-Tropsch reactor 8 for converting synthesis gas into a liquid hydrocarbon product 1.

As an alternative to the Fisher-Tropsch reactor 8, the apparatus can comprise means for subjecting the synthesis gas 7 to a methanol or ethanol synthesis (not shown in the figures) or means for hydro formylation of the synthesis gas 7 to produce aldehydes.

The apparatus shown in the FIGURE comprises several processing means between the gasifier 6 and the Fisher-Tropsch reactor. Each processing means is configured for performing a processing step in a process for converting the stream of raw product gas 3 into a synthesis gas.

The apparatus comprises a conduit system (not marked with a reference numeral) for feeding the stream of raw product gas 3 from the gasifier 6 through the several processing means and for feeding a stream of the synthesis gas into the Fisher-Tropsch reactor.

One of the several processing means comprises a gas purificator 10 for separating carbon dioxide 9 from the stream of raw product gas 3.

The gas purificator 10 is preferably, but not necessarily, configured to perform a process in which methanol is used as a solvent for separating carbon dioxide from the stream of raw product gas 3. The gas purificator 10 comprises preferably, but not necessarily, means for subjecting the stream of raw product gas 3 to a physical wash with methanol at a low temperature and at a high pressure to obtain a solvent containing at least carbon dioxide, and means for lowering the pressure of the solvent containing at least carbon dioxide and/or steam stripping the solvent containing at least carbon dioxide to release and recover the carbon dioxide.

The apparatus comprises feeding means 24 for feeding a stream of the carbon dioxide 9 separated in the gas purificator 10 from the stream of raw product gas 3 to at least one part of the apparatus, wherein said at least one part of the apparatus being selected from: the biomass supply system 4, the gasifier 6 and at least one of the several processing means (10 (the gas purificator), 12 (the reformer), 13 (the cooler), and 14 (the filter)). In the figures the feeding means 24 comprises a conduit arrangement (not marked with a reference numeral) to which a compressor 25 is functionally arranged for increasing the pressure of the carbon dioxide and for creating a flow of carbon dioxide 9 in the conduit arrangement. The feeding means 24 comprises also other equipment, such as valves that are not shown in the FIGURE for the sake of clarity.

In the apparatus shown in the FIGURE the biomass supply system 4 comprises a lock-hopper 11 for producing a stream of pressurized biomass 5 by pressurizing the biomass 2 with pressurizing gas. In the FIGURE the feeding means 24 are configured for feeding a stream of the carbon dioxide 9 separated in the gas purificator 10 from the gas purificator 10 into the lock-hopper 11 to be used as pressurizing gas in the lock hopper.

The feeding means 24 of the apparatus are preferably, but not necessarily, configured for feeding a stream of the carbon dioxide 9 separated in the gas purificator 10 to a storage means 17 for storing carbon dioxide separated from the stream of raw product gas 3. The storage means 17 is any means suitable for storing carbon dioxide, for example a storage tank 17. Having such storage tank 17 ensures that the stream of carbon dioxide 9 to the different parts of usage can be kept at an even level.

The feeding means 24 of the apparatus are preferably, but not necessarily, configured for feeding a stream of carbon dioxide 9 from the gas purificator 10 to a storage means 17 for storing carbon dioxide and the apparatus comprises preferably, but not necessarily, an arrangement for feeding a stream of carbon dioxide 9 into the apparatus in case of shutdown for using carbon dioxide as protective gas in the apparatus during the shutdown. Alternatively or in addition, the feeding means 24, 25 can be configured for feeding a stream of carbon dioxide 9 from the storage means 17 into the apparatus for inertization of the apparatus. For example in case of a startup of the process carbon dioxide 9 can be fed into the apparatus for removing possible oxygen present in the apparatus. Also in case of a shutdown of the process carbon dioxide 9 can be fed into the apparatus for removing raw product gas 3 or synthesis gas 7 from the process. Alternatively or in addition, the feeding means 24, 25 can be configured for feeding a stream of carbon dioxide 9 from the storage means 17 to at least one part of the apparatus the part being selected from the biomass supply system 4, the gasifier 6 and at least one of the several processing means 10, 12, 13, 14.

It is apparent to a person skilled in the art that as technology advances, the basic idea of the invention can be implemented in various ways. The invention and its embodiments are therefore not restricted to the above examples, but they may vary within the scope of the claims.

LIST OF REFERENCE NUMERALS USED

1. Liquid hydrocarbon product
2. Biomass
3. Stream of an raw product gas
4. Biomass supply system
5. Stream of pressurized biomass
6. Gasifier
7. Stream of synthesis gas
8. Fisher-Tropsch reactor
9. Stream of carbon dioxide
10. Gas purificator
11. Lock hopper
12. Reformer
13. Cooler
14. Filter
15. Fly ash discharge vessel
16. Pressurizing gas
17. Storage means
18. Ash and/or soot discharge vessel of the reformer
19. Ash and/or soot discharge vessel of the cooler
20. First fuel silo
21. Second fuel feeding silo
22. Valve
23. Ash discharge vessel of the gasifier
24. Feeding means
25. Flowing means

The invention claimed is:

1. A method for producing synthesis gas from biomass, wherein the biomass is waste and by-products of the wood processing industry and comprises crushed biomass particles having a diameter between 30 and 80 millimeters, in which method an apparatus is used, which comprises a biomass supply system, a gasifier for gasifying biomass to produce raw product gas and several gas processing means for processing raw product gas to produce synthesis gas, characterized by the method comprising pressurizing the crushed biomass particles to obtain a stream of pressurized biomass producing raw product gas by feeding the stream of pressurized biomass into the gasifier for at least partial combustion of the biomass to obtain a stream of raw product gas, wherein the biomass is fed to the gasifier by means of pressurizing gas in a biomass supply system, and purifying the stream of raw product gas from the gasifier through said several gas processing means, wherein each of said several gas processing means is arranged for performing a processing step of said purifying step for converting the stream of raw product gas to a stream of synthesis gas, wherein one of the processing steps is a carbon dioxide separation step for separating carbon dioxide from the stream of raw product gas in a gas processing means comprising a gas purificator, wherein at least one of the several gas processing means including a purifying step is a catalytic processing step performed in a gas processing means comprising a reformer operating at a temperature of between 700 to 1000° C. and at a pressure of between 2 to 25 bar;

wherein the method further comprises feeding a stream of the carbon dioxide separated in the gas purificator to at least one part of the apparatus, said at least one part of the apparatus being selected from: the biomass supply system, the gasifier, and at least one of said several gas processing means; and wherein one of the processing steps is a filtering step for filtering bed material that is in the raw product gas.

2. The method according to claim 1, characterized by using a lock-hopper in the biomass supply system for feeding biomass to the gasifier by pressurizing biomass by means of pressurizing gas, and by feeding a stream of the carbon dioxide to the lock-hopper, and by using the carbon dioxide as pressurizing gas in the lock-hopper.

3. The method according to claim 1, characterized by using a gasifier for obtaining the stream of raw product gas by at least partial combustion of the pressurized biomass, by feeding a stream of the carbon dioxide into the gasifier, and by using the carbon dioxide for extracting bottom ash in the gasifier.

4. The method according to claim 1, characterized by feeding a stream of the carbon dioxide into the reformer, for removing sediments from the reformer.

5. The method according to claim 1, characterized by at least one of the processing steps of the purifying step is a cooling step for lowering the temperature of the stream of the raw product gas, which cooling step is performed in a gas processing means comprising a cooler, and by feeding a stream of the carbon dioxide into the cooler for removing sediments from the cooler.

6. The method according to claim 1, characterized by the filtering step is performed in a gas processing means comprising a filter, and by feeding a stream of the carbon dioxide into the filter for removing sediments from filter.

7. The method according to claim 1, characterized by the filtering step for filtering bed material that is in the raw product gas includes feeding particles removed from the stream of the raw product gas in the filter to a fly ash discharge vessel, and by feeding a stream of the carbon dioxide onto the bottom of the fly ash discharge vessel.

8. The method according to claim 7, characterized by using the carbon dioxide for separating an ash fraction from an unburned soot/char fraction in the fly ash discharge vessel.

9. The method according to claim 4, characterized by feeding the stream of the carbon dioxide as a pulsing stream of carbon dioxide.

10. The method according to claim 1, characterized by feeding a stream of the carbon dioxide into the apparatus to remove gases from the apparatus for inertization of the apparatus.

11. The method according to claim 1, characterized by feeding a stream of the carbon dioxide into the apparatus in case of a shutdown or startup as protective gas.

12. The method according to claim 1, characterized by said carbon dioxide removal step for separating of carbon dioxide from the stream of raw product gas in the gas processing means includes the steps of:

subjecting the stream of raw product gas to methanol at a low temperature and at a high pressure to obtain a solvent containing at least carbon dioxide, and lowering the pressure of the solvent containing at least carbon dioxide and/or steam stripping the solvent containing at least carbon dioxide to release and recover the carbon dioxide.

13. The method according to claim 1, characterized by a step for feeding a stream of carbon dioxide separated in the gas purificator to a storage means.

14. The method according to claim 13, characterized by a step for feeding a stream of the carbon dioxide from the storage means into the apparatus for removing gases from the apparatus during shutdown or startup of the apparatus or for using carbon dioxide as a protective gas during shutdown or startup of the apparatus.

15. The method according to claim 13, characterized by a step for feeding a stream of the carbon dioxide from the storage means into at least one part of the apparatus, said at least one part of the apparatus being selected from: the biomass supply system, the gasifier, and at least one of said several gas processing means.

* * * * *